United States Patent [19]

Hutson

[11] Patent Number: 4,595,034
[45] Date of Patent: Jun. 17, 1986

[54] THREE-POSITION, FOUR-WAY, SHORT-STROKE ROTARY VALVE

[76] Inventor: Roy C. Hutson, 1418 Sandy Hollow Rd., Rockford, Ill. 61109

[21] Appl. No.: 628,152

[22] Filed: Jul. 5, 1984

[51] Int. Cl.⁴ .................. F15B 13/04; F16K 11/06
[52] U.S. Cl. ............................ 137/625.21; 251/286
[58] Field of Search ............... 267/150; 151/284, 286, 151/150; 74/491, 495; 200/153 K; 137/625.21, 625.22, 625.23, 625.24

[56] References Cited

U.S. PATENT DOCUMENTS

| Re. 30,517 | 2/1981 | McClocklin | 137/625.21 |
| 2,120,876 | 6/1938 | Trautner | 200/153 K |
| 2,127,679 | 8/1938 | Dudley | 137/625.23 |
| 2,204,096 | 6/1940 | Metcalf | 200/153 K |
| 3,021,869 | 2/1962 | Ross | 137/625.24 |
| 3,382,733 | 5/1968 | Miller et al. | 200/153 K X |
| 4,342,332 | 8/1982 | Lapp | 137/625.23 |

Primary Examiner—Martin P. Schwadron
Assistant Examiner—John S. Starsiak, Jr.
Attorney, Agent, or Firm—Leydig, Voit & Mayer, Ltd.

[57] ABSTRACT

Passages are formed in a valve disc to enable the disc to rotate to active positions on either side of a neutral position upon being moved through a relatively small angle of 30 degrees. The passages are of a simplified nature by virtue of the valve disc being formed with a multi-branch pressure passage in which one branch is positively blocked off when pressure fluid is being supplied through the other branch. The valve disc is adapted to be turned between its positions by an elongated handle which is biased to its neutral position and is positively stopped in its active positions.

9 Claims, 13 Drawing Figures

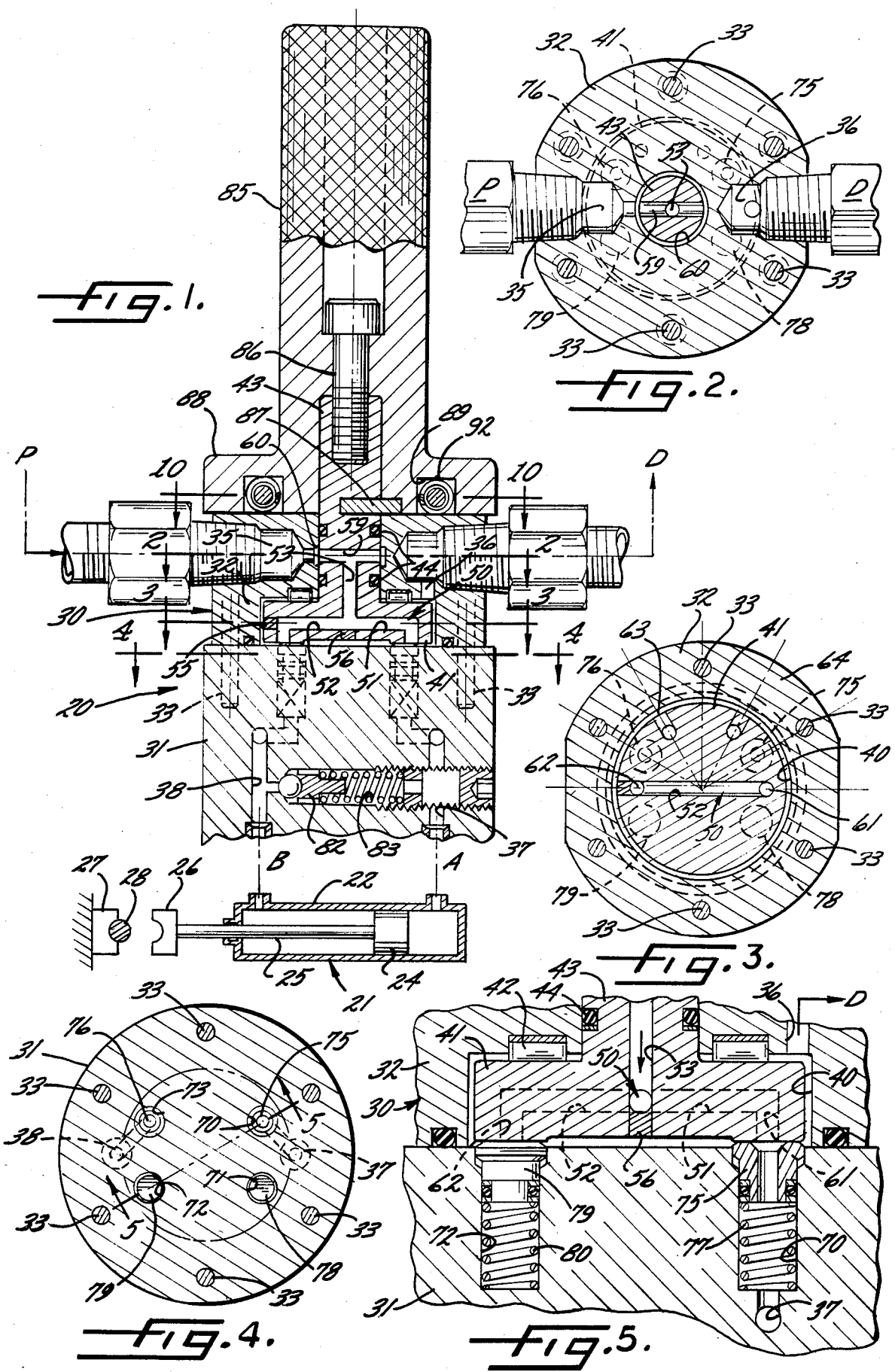

THREE-POSITION, FOUR-WAY, SHORT-STROKE ROTARY VALVE

BACKGROUND OF THE INVENTION

This invention relates to a three-position, four-way rotary valve of the type in which a valve member is rotatably mounted in a valve housing. When the valve member is rotated in one direction from a neutral position to a first active position, passages in the valve enable pressurized fluid to flow to the first side of a utilization device (e.g., a hydraulic cylinder) while additional passages enable pressure fluid to dump to drain from the other side of the utilization device. If the valve member is rotated in the opposite direction from its neutral position to a second active position, the second side of the utilization device is pressurized and, at the same time, the first side of the utilization device is connected to drain.

Such a valve may, for example, be used in connection with a hand-manipulated tool whose operating elements are actuated by a hydraulic cylinder which is controlled by the valve.

More specifically, the invention relates to a valve in which the valve member is rotated between its positions by manually turning an actuator which is associated with the valve. Even more specifically, the invention relates to a three-position, four-way rotary valve whose valve member may be rotated between its various positions by turning the valve actuator through only a relatively small angle so as to facilitate simple and easy actuation of the valve. A three-position, four-way, "short-stroke" rotary valve of this general type is disclosed in Lapp U.S. Pat. No. 4,342,332. In that valve, the various ports and passages in the valve member and the valve housing are arranged and located so as to enable the valve member to move between its various positions while turning through a comparatively small angle such as 30 degrees rather than through the more conventional angle of 45 degrees.

SUMMARY OF THE INVENTION

The general aim of the present invention is to provide a new and improved three-position, four-way, short-stroke rotary valve of the foregoing type in which the ports and passages are reduced in number and are formed and located in a simpler manner so as to reduce the complexity of manufacturing the valve member.

A more detailed object is to achieve the foregoing by providing a valve in which the valve member is formed with a multi-branch pressure passage and in which one branch of the pressure passage is positively blocked off when pressure fluid is being supplied through the other branch.

Another object of the invention is to provide a valve of the foregoing type in which the actuator is in the form of an elongated handle which is uniquely biased to its neutral position and is positively stopped in its active positions.

These and other objects and advantages of the invention will become more apparent from the following detailed description when taken in conjunction with the accompanying drawings.

BRIEF DESCRIPTION OF THE DRAWINGS

FIG. 1 is a fragmentary cross-sectional view taken axially through a new and improved valve incorporating the unique features of the present invention, the valve being shown in conjunction with a typical utilization device and the valve member being shown in its neutral position.

FIGS. 2, 3 and 4 are cross-sections taken substantially along the lines 2—2, 3—3 and 4—4, respectively, of FIG. 1.

FIG. 5 is an enlarged fragmentary cross-section taken substantially along the line 5—5 of FIG. 4.

DETAILED DESCRIPTION OF THE PREFERRED EMBODIMENT

Figure 6:
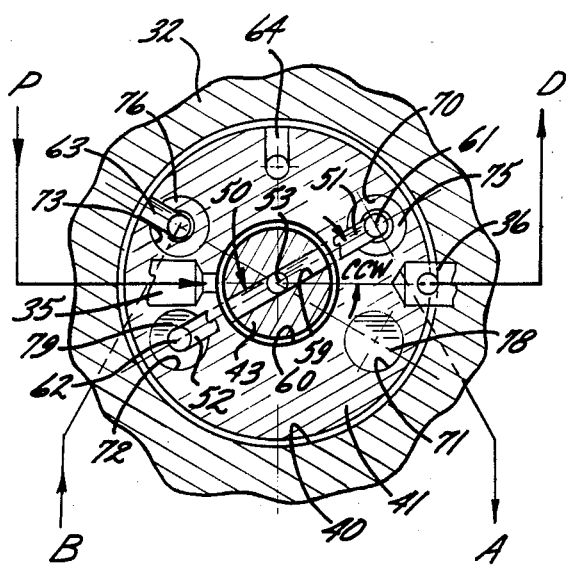
FIGS. 6 and 7 are views somewhat similar to FIGS. 3 and 5, respectively, but schematically show the valve member in one of its active positions.

As shown in the drawings for purposes of illustration, the invention is embodied in a three-position, four-way rotary valve 20 for controlling the flow of pressure fluid to and from a hydraulic utilization device 21. The latter may, for example, comprise a cylinder 22 which slidably receives a piston 24 having a rod 25 projecting therefrom and carrying a crimping die 26. When pressure fluid is admitted into the head end of the cylinder and is dumped from the rod end of the cylinder, the die is advanced and coacts with a fixed die 27 to crimp a workpiece 28 located between the dies. The die 26 is retracted away from the die 27 when pressure fluid is admitted into the rod end of the cylinder and is dumped from the head end of the cylinder.

Figure 7:
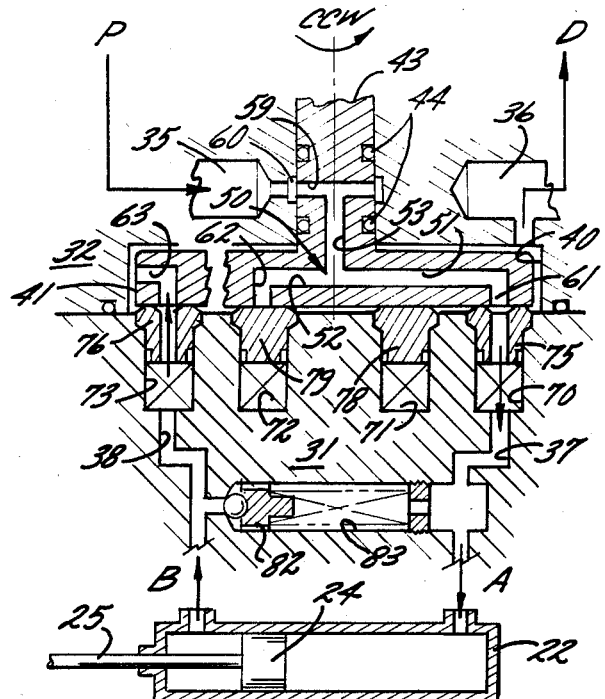

The valve 20 comprises a housing 30 formed by a lower body 31 and by an upper cap 32 which are secured together by screws 33. Pressure fluid is delivered to the valve 20 by a pressure line P leading from a pump (not shown) and connected to a pressure port 35 (FIG. 2) formed in one side of the valve cap 32. A drain line D is connected to a drain port 36 in the other side of the cap and leads to a return tank (not shown). Pressure fluid is supplied to and dumped from the head end of the cylinder 22 via a line A which communicates with a passage 37 (FIGS. 1 and 7) formed in the valve body 31. A fourth line B communicates with another passage 38 in the valve body and conducts pressure fluid to and from the rod end of the cylinder.

As shown most clearly in FIG. 5, a chamber 40 is defined within the valve housing 30 between the body 31 and the cap 32. A cylindrical valve member or disc 41 is located within the chamber with substantial axial and radial clearance and is rotatably supported on an annular needle bearing 42 located at the upper end of the chamber and secured to the cap. An upright shaft 43 is formed integrally with and extends upwardly from the upper side of the valve disc 41. The shaft is rotatably received within a bore in the cap and is sealed therein by a pair of O-rings 44. The axis of the shaft defines the rotational axis of the valve disc.

Normally, the valve disc 41 is located in a neutral position (see FIGS. 1, 3 and 5). In this instance, the valve 20 is of the open center type and thus, when the valve disc 41 is in its neutral position, communication is established directly between the pressure line P and the drain line D (see FIG. 1). When the valve disc is rotated counterclockwise from its neutral position to a first active position (FIGS. 6 and 7), communication is established between the pressure line P and the line A so that pressure fluid from the pump may flow to the head end of the cylinder 22 to advance the rod 25. At the same time, communication is established between the line B and the drain line D to enable pressure fluid in the rod end of the cylinder to return to the tank.

Conversely, clockwise rotation of the valve disc 41 from its neutral position to a second active position (FIGS. 8 and 9) establishes communication between the pressure line P and the line B and also establishes communication between the line A and the drain line D. Thus, pressure fluid is allowed to flow to the rod end of the cylinder 22 and to flow from the head end of the cylinder to effect retraction of the rod 25.

Like the valve disclosed in Lapp U.S. Pat. No. 4,342,332, the present valve 20 is designed so that the valve disc 41 may be moved from its neutral position to either of its active positions while being turned through only a relatively short angular stroke (e.g., 30 degrees). In accordance with the present invention, this is achieved with much simpler porting than previously has been possible so as to reduce the complexity and cost of manufacturing the valve.

More specifically, a pressure passage 50 (FIGS. 1 and 7) is formed in the valve disc 41 and the shaft 43 and includes three branches 51, 52 and 53 which communicate with one another. In this particular instance, the pressure passage is generally in the shape of an inverted T with the branches 51 and 52 extending radially or horizontally within the valve disc and with the branch 53 extending axially and upwardly from the horizontal branches and into the shaft 43. The branches 51 and 52 are formed by drilling radially into one side of the disc and then closing the outer end of the drilled hole with a weld 55 as indicated in FIG. 1. The branch 53 is formed by drilling axially upwardly from the center of the lower side of the disc and then closing the lower end of the drilled hole with a weld 56.

A radially extending cross passage 59 (FIGS. 1, 2 and 7) is formed through the shaft 43 at the upper end of the vertical branch 53 of the pressure passage 50. The cross passage 59 and the pressure port 35 both communicate with a continuous annular groove 60 formed in the valve cap 32 in the vicinity of the cross passage. Thus, pressure fluid from the pressure line P is supplied to the cross passage 59 and the pressure passage 50 at all times regardless of the angular position of the valve disc 41 and the shaft 43. The cross passage 59 and the groove 60 are located between the two O-rings 44 and thus pressure fluid is sealed against flow along the shaft and into the chamber 40.

Diametrically spaced passages 61 and 62 (FIGS. 3, 5 and 7) are drilled upwardly from the lower end of the valve disc 41 and communicate with the outer ends of the branches 51 and 52, respectively, of the pressure passage 50. In addition, two drain passages 63 and 64 (FIGS. 3, 7 and 8) are formed in the valve disc between the passages 61 and 62. The drain passages are spaced 60 degrees from one another with the drain passage 63 being spaced 60 degrees from the passage 62 and with the drain passage 64 being spaced 60 degrees from the passage 61 (see FIG. 6). Each drain passage is generally L-shaped with one end of the passage opening axially out of the lower end of the valve disc 41 and with the other end of the passage opening radially out of the side of the disc and communicating with the chamber 40. Each drain passage is formed by drilling axially into the disc and then by drilling radially into the disc or vice versa.

In carrying out the invention, means are provided in the valve body 31 for (1) establishing communication between one of the pressure passages 61, 62 and one of the lines A, B, (2) establishing communication between one of the drain passages 63, 64 and the other line B, A, and (3) blocking off the other pressure passage 62, 61 whenever the valve disc 41 is turned to either of its active positions. For this purpose, four angularly spaced holes 70, 71, 72 and 73 (FIGS. 6 and 7) are drilled downwardly from the chamber 40 and into the upper end of the valve body 31. The holes are spaced from one another around a circle with the hole 70 being spaced diametrically from the hole 72 and with the hole 71 being spaced diametrically from the hole 73. The hole 70 is spaced 60 degrees from the hole 71 and is spaced 120 degrees from the hole 73. The passage 37 in the valve body 31 extends from the lower end of the hole 70 and establishes communication between that hole and the line A. Similarly, the passage 38 in the valve body leads from the lower end of the hole 73 and connects the latter hole with the line B. The holes 71 and 72 are "blind" holes, that is, they simply terminate within the valve body 31.

Tubular valve grommets 75 and 76 defining outlet ports are telescoped into the holes 70 and 73, respectively, and are urged upwardly into pressure-tight sealing engagement with the lower side of the valve disc 41 by coiled compression springs 77 (see FIG. 5). Because the grommets 75 and 76 are tubular, pressure fluid may flow through the grommets to or from the passages 37 and 38. For a purpose to be described subsequently, sealing elements in the form of non-tubular grommets 78 and 79 are telescoped into the holes 71 and 72, respectively, and are urged into pressure-tight sealing engagement with the lower side of the valve disc by coiled compression springs 80 (FIG. 5).

To explain the operation of the valve 20 are described thus far, assume that the valve disc 41 is in its neutral position as shown in FIGS. 3 and 5. When the valve disc is so positioned, the passage 61 is located midway between the grommets 75 and 78 while the passage 62 is located midway between the grommets 76 and 79 (FIG. 3). Pressure fluid from the pressure line P flows into the groove 60, the cross passage 59 and the branches 53, 51 and 52 of the pressure passage 50, flows downwardly out of the open passages 61 and 62 to the chamber 40, and then flows upwardly in the chamber and along the outer side of the valve disc 41 to the drain port 36, the latter communicating with the chamber 40 as well as with the drain line D. Accordingly, the pressure fluid is returned directly to the tank. The tubular valve grommets 75 and 76 seal against and are closed off by the lower side of the valve disc 41 and thus pressure fluid is prevented both from flowing to the cylinder 22 and from escaping out of the cylinder via the passages 37 and 38.

When the valve disc 41 is turned 30 degrees in a counterclockwise direction from its neutral position to its first active position (see FIGS. 6 and 7), the passage 61 in the valve disc moves into alinement with the tubular grommet 75, the drain passage 63 moves into alinement with the other tubular grommet 76 and the passage 62 moves into alinement with the non-tubular grommet 79. As a result, pressure fluid from the branch 51 flows out of the passage 61 and through the tubular grommet 75 and the passage 37 to the line A to pressurize the head end of the cylinder 22 and advance the rod 25. At the same time, pressure fluid is dumped from the rod end of the cylinder and flows to the tank via the line B, the passage 38, the tubular grommet 76, the drain passage 63, the chamber 40, the drain port 36 and the drain line D. Importantly, the flow of pressure fluid through the branch 52 of the main pressure passage 50 is blocked by virtue of the non-tubular grommet 79 sealing against and closing the passage 62. Thus, the only path for pressurized flow is the previously described path to the head end of the cylinder 22.

Figure 8:
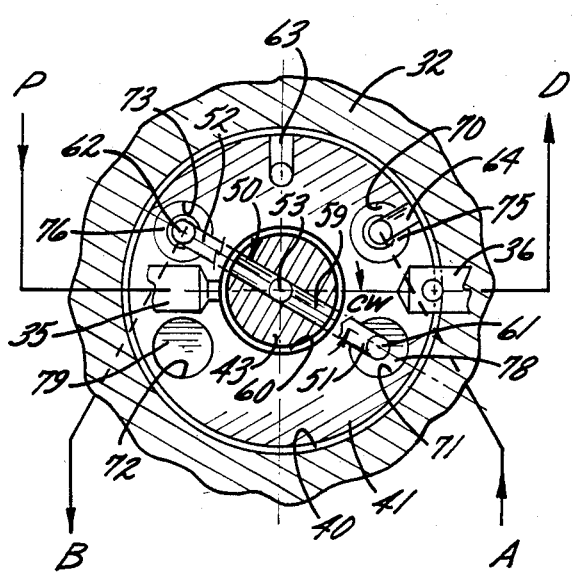
FIGS. 8 and 9 are schematic views similar to FIGS. 6 and 7, respectively, but show the valve member in its other active position.
Figure 9:
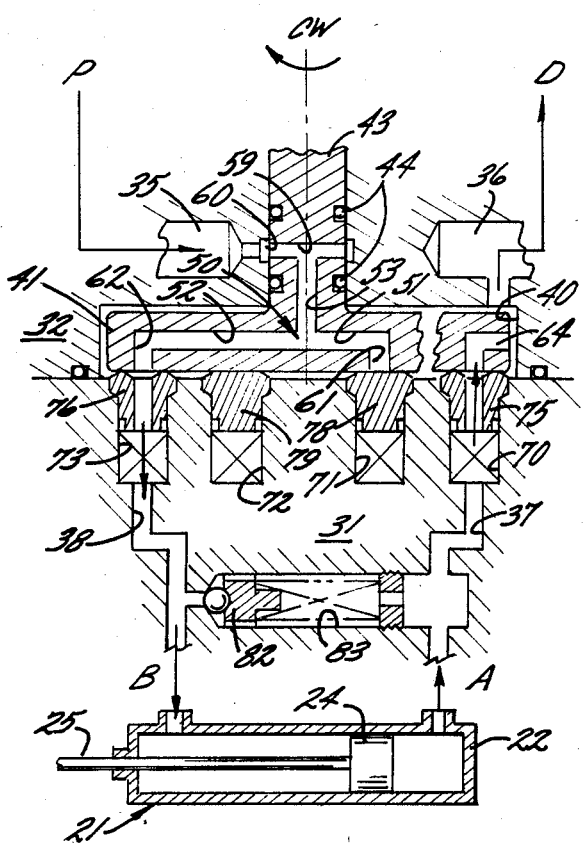

If the valve disc 41 is turned 30 degrees in a clockwise direction from its neutral position to its second active position as shown in FIGS. 8 and 9, the passage 62 and the drain passage 64 move into alinement with the tubular grommets 76 and 75, respectively, and the passage 61 moves into alinement with the non-tubular grommet 78. Pressure fluid from the branch 52 thus flows out of the passage 62 and through the tubular grommet 76 and the passage 38 to the line B to pressurize the rod end of the cylinder 22 and retract the rod 25. As the rod retracts, pressure fluid in the head end of the cylinder flows to the tank by way of the line A, the passage 37, the tubular grommet 75, the drain passage 64, the chamber 40, the drain port 36 and the drain line D. The non-tubular grommet 78 closes off the passage 61 and the branch 51 and prevents pressurized fluid from flowing out of the passage 61 and into the low pressure chamber 40. In the event that the pressure in the rod or return end of the cylinder 22 exceeds a predetermined value, a relief valve 82 opens and allows the pressure fluid in the passage 38 to flow to the tank via the passage 37. The relief valve is located in a passage 83 formed in the valve body 31 and extending between the passages 37 and 38.

From the foregoing, it will be apparent that the present invention brings to the art a new and improved three-position, four-way, short stroke rotary valve having a valve disc 41 with comparatively simple porting. That is, it is necessary only to drill nine holes in the valve disc and the shaft 43 to form the various passages therein. All drilling may be performed in the radial and axial directions and thus there is no need for more complex angled drilling. Accordingly, the disc may be manufactured in a relatively simple manner.

In accordance with another aspect of the invention, the valve disc 41 is adapted to be turned between its various positions by a member 85 which also serves as the gripping handle for the valve 20. Moreover, unique means are provided for biasing the handle to a neutral position while automatically stopping turning of the handle when the valve disc reaches either of its active positions.

Figure 10:
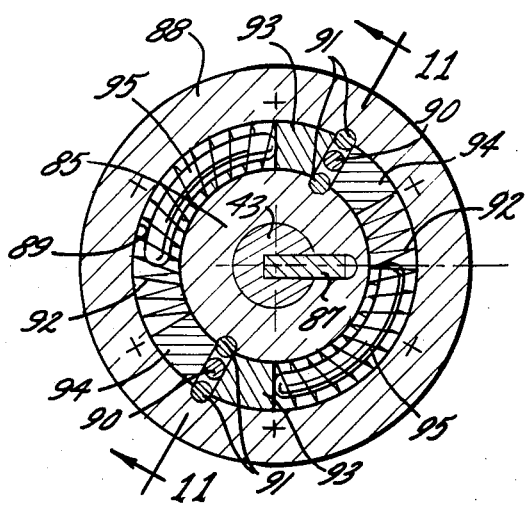
FIG. 10 is a cross-section taken substantially along the line 10—10 of FIG. 1 and shows the valve actuating handle in a neutral position.
Figure 11:
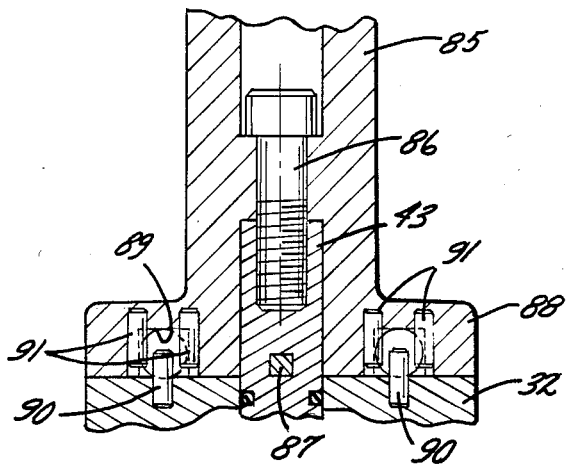
FIG. 11 is a cross-section taken substantially along the line 11—11 of FIG. 10.

As shown in FIGS. 1, 10 and 11, the handle 85 is a tubular member which is telescoped over the upper end portion of the shaft 43. The handle is connected to the shaft by a screw 86 and by a radially extending drive key 87. Thus, rotation of the handle effects turning of the valve disc 41.

The lower end of the handle 85 is formed with a radially extending flange 88 (FIG. 11) which rides against the upper side of the valve cap 32. An annular groove 89 is formed in the flange and opens downwardly out of the lower side thereof. Two diametrically spaced stop pins 90 are anchored to the upper side of the valve cap and project upwardly into the groove as shown in FIG. 11. Each stop pin normally is straddled by a pair of drive pins 91 fastened rigidly to the handle 85 and extending downwardly into the groove.

Located within each 180 degrees of the groove 89 are a coiled compression spring 92 and two free floating blocks 93 and 94 disposed at opposite ends of the spring. Each spring normally urges the blocks against the pins 90 and 91 (see FIG. 10) and thus the handle 85 normally is biased to and held yieldably in its neutral position. When the handle is turned counterclockwise (see FIG. 12), the drive pins 91 act against the blocks 93 to shift those blocks angularly in the groove 89 and thereby compress the springs 92 against the blocks 94 and the fixed stop pins 90. Accordingly, the springs are resiliently loaded and serve to automatically return the handle clockwise to its neutral position when the turning force is removed from the handle. Similarly, clockwise turning of the handle (see FIG. 13) causes the drive pins 91 to act against and shift the blocks 94 so as to compress the springs 92 against the blocks 93 and the stop pins 90 and effect automatic return of the handle when the turning force is removed.

In order to automatically stop turning of the handle 85 when the valve disc 41 reaches either of its active positions, an arcuate stop rod 95 is disposed loosely within each spring 92. Each stop rod is of such angular length that 30 degrees of angular space is left between one end of the rod and the adjacent block 93 or 94.

Figure 12:
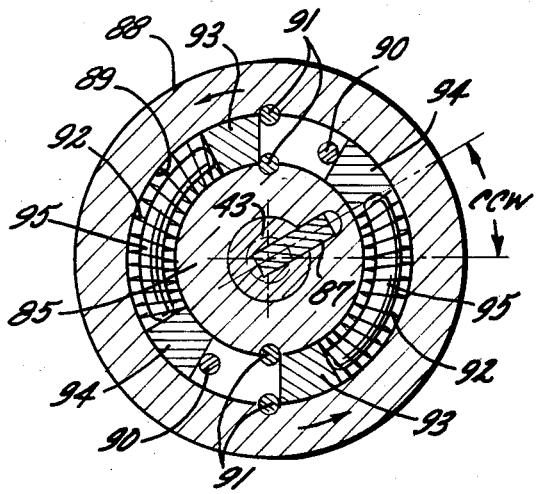
FIG. 12 is a view similar to FIG. 10 but shows the valve actuating handle in one of its active positions.
Figure 13:
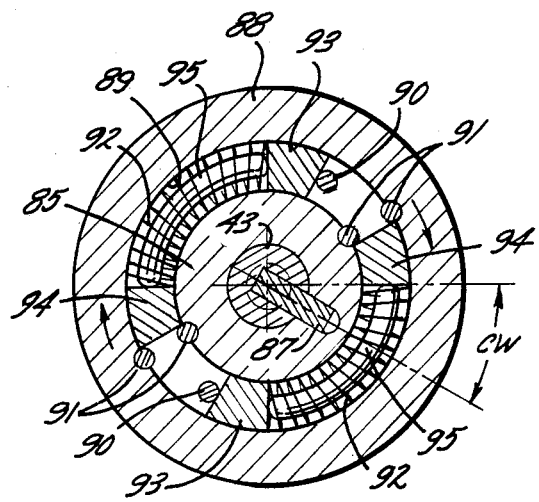
FIG. 13 is also a view similar to FIG. 10 but shows the valve actuating handle in its other active position.

When the blocks 93 are shifted by counterclockwise turning of the handle 85, those blocks shift the stop rods 95 counterclockwise until the latter travel through 30 degrees and stop against the blocks 94 to prevent further counterclockwise turning of the handle (see FIG. 12). In a like manner, the blocks 94 shift the stop rods 95 clockwise when the handle is turned in a clockwise direction. Clockwise turning of the handle is prevented when the stop rods 95 travel through 30 degrees and are stopped by the blocks 93 and the pins 90 as shown in FIG. 13.

I claim:

1. A three-position, four-way rotary valve comprising a housing having a pressure port, a drain port and first and second outlet ports, a chamber defined within said housing, a valve member rotatably mounted in said chamber and rotatable in one direction through less than 45 degrees from a neutral position to a first active position and in the opposite direction less than 45 degrees from said neutral position to a second active position, said drain port communicating directly with said chamber in all positions of said valve member, first and second drain passages formed in said valve member and communicating with said drain port by way of said chamber in all positions of said valve member, said pressure port being sealed against direct communication with said chamber by said valve member whenever said valve member is in either of said active positions, a pressure passage formed in said valve member and having first, second and third branches which communicate with one another, the third branch of said pressure passage communicating with said pressure port whenever said valve member is in either of said active positions, said first branch pressure passage communicating with said first outlet port and said first drain passage communicating with said second outlet port when said valve member is in said first active position, said second branch of said pressure passage communicating with said second outlet port and said second drain passage communicating with said first outlet port when said valve member is in said second active position, and means for closing off said second branch of said pressure passage when said valve member is in said first active position and for closing off said first branch of said pressure passage when said valve member is in said second active position.

2. A valve as defined in claim 1 in which said first and second outlet ports are spaced from one another by a predetermined angle greater than 90 degrees and less than 180 degrees, said closing means comprising first and second sealing elements biased against said valve member, said first and second sealing elements being spaced 180 degrees from said first and second outlet ports, respectively, and being spaced from said second and first outlet ports, respectively, by an angle to one-half said predetermined angle.

3. A valve as defined in claim 2 further including tubular means disposed in said outlet ports and biased against said valve member.

4. A valve as defined in claim 1 further including a shaft extending axially from said valve member, said first and second branches of said pressure passage extending diametrically of said valve member, said third branch of said pressure passage extending axially from the center of said valve member and extending axially into said shaft.

5. a valve as defined in claim 4 further including a cross passage extending radially of said shaft and intersecting the third branch of said pressure passage.

6. A valve as defined in claim 1 further including an actuating handle rotatable with and extending axially from said valve member and rotatable relative to said housing through the same positions as said valve member, stop means on said housing, spring means acting between said handle and said stop means, said spring means biasing said handle to its neutral position against said stop means while permitting said handle to be rotated in either direction from said neutral position, and additional stop means for preventing said handle from being rotated beyond said first active position in said one direction and beyond said second active position in said other direction.

7. A valve as defined in claim 6 in which said spring means comprise coiled compression springs, said additional stop means comprising free floating rods disposed within said springs and each being substantially shorter in length than its respective spring.

8. A three-position, four-way rotary valve comprising a housing having a pressure port, a drain port and first and second outlet ports, a chamber defined within said housing, a valve member rotatably mounted in said chamber and rotatable in one direction from a neutral position to a first active position and in the opposite direction from said neutral position to a second active position, one of said pressure and drain ports communicating directly with said chamber when said valve member is in either of said active positions, the other of said pressure and drain ports being sealed against direct communication with said chamber by said valve member whenever said valve member is in either of said active positions, first and second passages formed in said valve member and both communicating with said one port whenever said valve member is in either of said active positions, a third passage formed in said valve member and having first, second and third branches which communicate with one another, the third branch of said third passage communicating with said other port whenever said valve member is in either of said active positions, said first branch of said third passage communicating with said first outlet port and said first passage communicating with said second putlet port when said valve member is in said first active position, said second branch of said third passage communicating with said second outlet port and said second passage communicating with said first putlet port when said valve member is in said second active position, and means for closing off said second branch of said third passage when said valve member is in said first active position and for closing off said first branch of said third passage when said valve member is in said second active position.

9. A three-position, four-way rotary valve comprising a housing, a valve member rotatable in said housing in one direction from a neutral position to a first active position and in the opposite direction from said neutral position to a second active position, an actuating handle rotatable with an extending axially from said valve member and rotatable relative to said housing through the same positions as said valve member, stop means on said housing, coiled compression springs acting between said handle and said stop means, said springs biasing said handle to its neutral position against said stop means while permitting said handle to be rotated in either direction from said neutral position, and additional stop means for preventing said handle from being rotated beyond said first active position in said one direction and beyond said second active position in said other direction, said additional stop means comprising free floating rods disposed within said springs and each being substantially shorter in length than its respective spring.

* * * * *